Apr. 17, 1923.

S. H. HALL 1,452,153

MILKING MACHINE RELAY

Filed Feb. 18, 1921

WITNESS:

INVENTOR

Selden H. Hall

BY

Frank S. Busser

ATTORNEY.

Apr. 17, 1923.  
S. H. HALL  
1,452,153  
MILKING MACHINE RELAY  
Filed Feb. 18, 1921  
2 Sheets-Sheet 2

WITNESS:
Rob R Kitchel.

INVENTOR
Selden H. Hall
BY
Frank S. Busser
ATTORNEY.

Patented Apr. 17, 1923.

1,452,153

UNITED STATES PATENT OFFICE.

SELDEN H. HALL, OF POUGHKEEPSIE, NEW YORK, ASSIGNOR TO THE DE LAVAL SEPARATOR COMPANY, OF NEW YORK, N. Y., A CORPORATION OF NEW JERSEY.

MILKING-MACHINE RELAY.

Application filed February 18, 1921. Serial No. 446,037.

*To all whom it may concern:*

Be it known that I, SELDEN H. HALL, a citizen of the United States, residing at Poughkeepsie, county of Dutchess, and State of New York, have invented a new and useful Improvement in Milking-Machine Relays, of which the following is a full, clear, and exact description, reference being had to the accompanying drawings, which form a part of this specification.

My invention relates to cow milking machines and particularly to that class in which a positively operated master pulsation valve causes master pneumatic pulsations in a pipe line, which master pulsations in turn operate either an individual pulsator valve on a milking machine unit to produce pneumatic pulsations in a pipe leading to the teat cups, or a relay valve to produce pneumatic pulsations in a secondary pipe line. Such relay valves and secondary pulsation pipe lines are also used to transmit pulsations to the individual pulsator valve of a milking machine unit.

Both the individual pulsator valve specified and the relay valve specified may be regarded as "secondary pulsators" in that their operation is pneumatically controlled, through a pipe line, from a master pulsator.

The primary pulsations are produced by connecting the primary pulsation pipe alternately to atmosphere and a partial vacuum. The above mentioned secondary pulsators are operated by a differential piston under the influence of atmosphere, the partial vacuum and the pulsation. When the pulsation wave is equally divided about a line half way between the atmospheric line and the vacuum line, the operation of the secondary pulsator will be such as to have equal pauses at the two ends of its strokes, and the secondary vacuum and atmospheric waves will be of equal lengths. This is a desideratum, especially where a construction is provided whereby the individual pulsator forming part of the milking machine unit is arranged to operate two pairs of teat cups alternately, one pair being connected with atmosphere and the other with vacuum at one stroke, while the connections are reversed at the other stroke. It is obvious that if the secondary vacuum waves and the atmospheric waves are of different lengths, the operation of the two sets of teat cups will be unequal.

Conditions exist that tend to produce this inequality. To exhaust air from a pipe line requires a longer time than to fill such pipe line; and the further from the master valve the observations are made, the greater the distortion of the pulsation wave due to this cause. Hence the secondary pulsators of known systems do not ordinarily produce secondary pulsations having atmospheric waves and vacuum waves of the same length. In other words, unbalanced waves are produced. The variation in some installations may be so pronounced as to considerably reduce the utility of the system.

The object of my invention is to provide a secondary pulsator which, when operated by a primary wave, even when badly unbalanced, will produce secondary waves which are very closely balanced.

I accomplish this object by having a piston which, instead of being under the influence of two fixed pressures and one variable pressure, is under the influence of the primary pulsation and a pressure fixed at a point half way between the two extremes of the pulsation.

In the accompanying drawings, which show a preferred embodiment of my invention:

Figure 2:
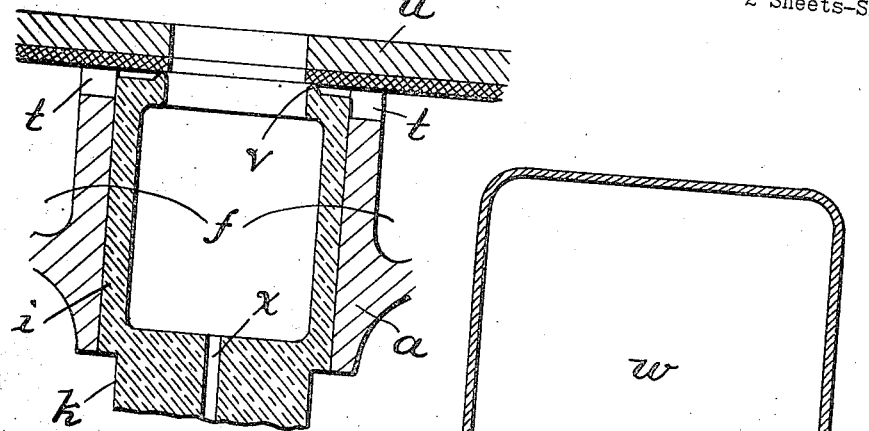
Fig. 2 is an enlarged section of the upper end of the piston and cylinder.
Figure 1:
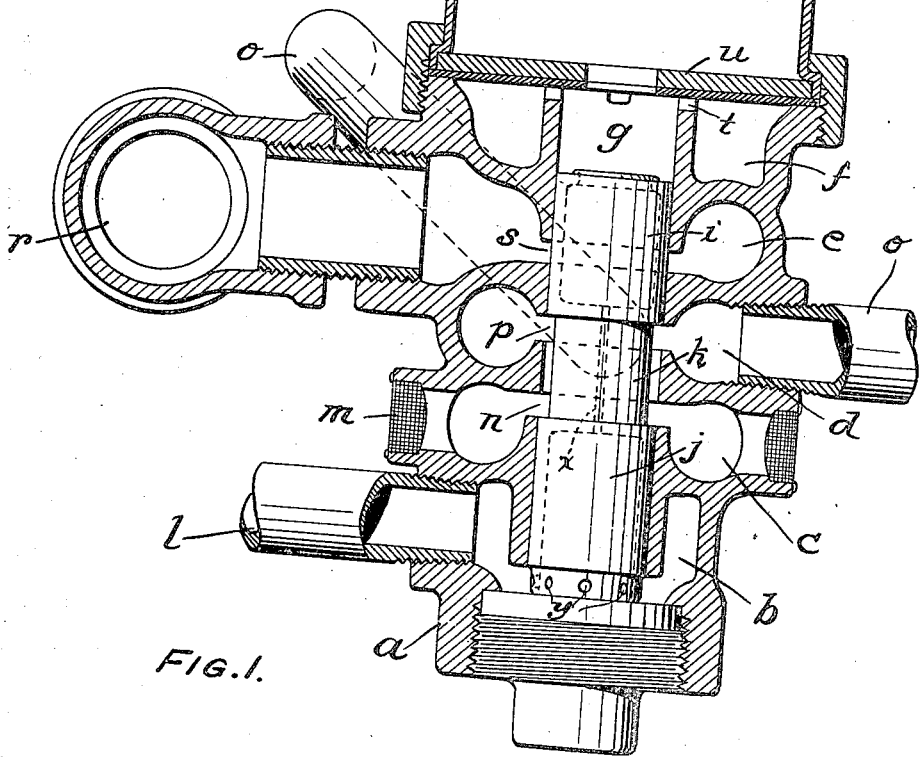
Fig. 1 is a cross-section of my complete relay.

*a* is a relay body having five annular spaces *b*, *c*, *d*, *e* and *f*, surrounding a central cylinder *g*, in which reciprocates a piston-valve. The piston-valve has two cylindrical portions *i* and *j* united by a neck *k* formed between the cylindrical portions. A hole *x* extends longitudinally through the central neck of the piston and affords a restricted communication between its cylindrical ends.

The annular space $b$ is in free communication with the cylindrical portion $j$ of the cylinder $g$ and with the master pulsation pipe $l$. When the piston-valve is in its lowest position communication between the bottom of the cylinder and the space $b$ is by means of the holes $y$ near the edge of the cylindrical portion $j$ of the piston-valve. The space $c$ is in communication through a strainer $m$ with the atmosphere and through a port $n$ with the interior of the cylinder $g$. The space $d$ is in free communication with one or more secondary pulsation pipes $o$ and through a port $p$ with the interior of the cylinder $g$. The space $e$ is in free communication with a vacuum pipe $r$ and through a port $s$ with the interior of the cylinder. The space $f$ communicates by passages $t$ with the top of the cylinder $g$.

Above the cylinder, in free communication with its center but separated from the space $f$ by a head $u$ having a soft lower side, is a chamber $w$. The upper end of the piston has a narrow bead $v$, of a smaller diameter than the piston, which, when the piston is at the top, contacts with the under side of the head $u$ and shuts the chamber $f$ and an annular space above the piston off from the center of the cylinder.

When in operation the primary pulsation is communicated to the bottom of the cylinder. Through the hole $x$ the bottom of the cylinder is in free but restricted communication with the chamber $w$. The chamber $w$ is so large relative to the hole $x$ that the variations in pressure of the pulsations are not transmitted to it. The pressure in the chamber is very nearly uniform at a value half way between the extremes of the pulsation wave. When a high pressure wave comes from the pipe $l$, the piston moves to the top. When a low pressure wave comes the piston moves to the bottom.

The pneumatic forces are such that were it not for the weight of the piston, the up and down strokes would be at equal time intervals. The weight of the piston causes a tendency for it to remain longer at the bottom than at the top. When the piston is at the top, the bead $v$ contacts with the under side of the head $u$, shutting the chamber $f$ and the annular space above the piston and outside of the bead off from communication with the interior of the piston and the chamber $w$. Leakage by the piston to the vacuum port $s$ reduces the pressure in the chamber $f$ and on the annular area outside the bead $v$ enough to compensate for the weight of the piston.

When the piston is in its lower position air is admitted through the screen $m$, the chamber $c$, port $n$, groove around the neck $k$, port $p$ and chamber $d$ to the secondary pulsation pipes $o$. When the piston is in its upper position, air escapes from the pipes $o$ through the chamber $d$, port $p$ groove around the neck $k$, port $s$, and chamber $e$ to the vacuum pipe $r$.

It will thus be seen that I have provided a relay or secondary pulsator which will produce a balanced secondary pulsation regardless of whether the primary pulsation is balanced or unbalanced.

Figure 3:
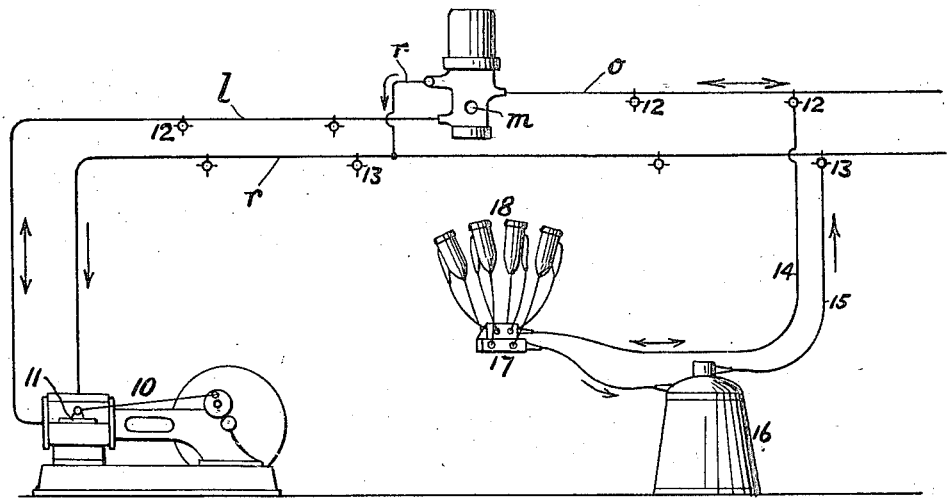
Fig. 3 is a diagram of a complete milking machine installation with my improved valve used to transmit pneumatic pulsations from a primary main pipe line to a secondary main pipe line.

In Fig. 3 my improved valve is shown adapted to a "relay valve" for transmitting master pulsations from a primary pulsation line to a secondary pulsation line. The vacuum line $r$, the primary pulsation line $l$, the secondary pulsation pipe line $o$ and the atmospheric ports $m$ correspond to the similarly lettered parts in Fig. 2. The vacuum pump 10 is shown connected with vacuum line $r$. The master pulsator valve 11, shown as connected with the primary pulsation line $l$, is operable from the vacuum pump 10. Cocks 12 are arranged along pipe $l$ and $o$, and to any of these cocks is adapted to be connected the pulsation pipe 14 of a portable milking machine unit. Cocks 13 are arranged along the vacuum pipe $r$, and to any of these cocks is adapted to be connected the vacuum pipe 15 of such portable milking machine unit. 16 is the milk pail, 17 the claw (usually containing a claw pulsator, not shown) and 18 the teat cups.

Figure 4:
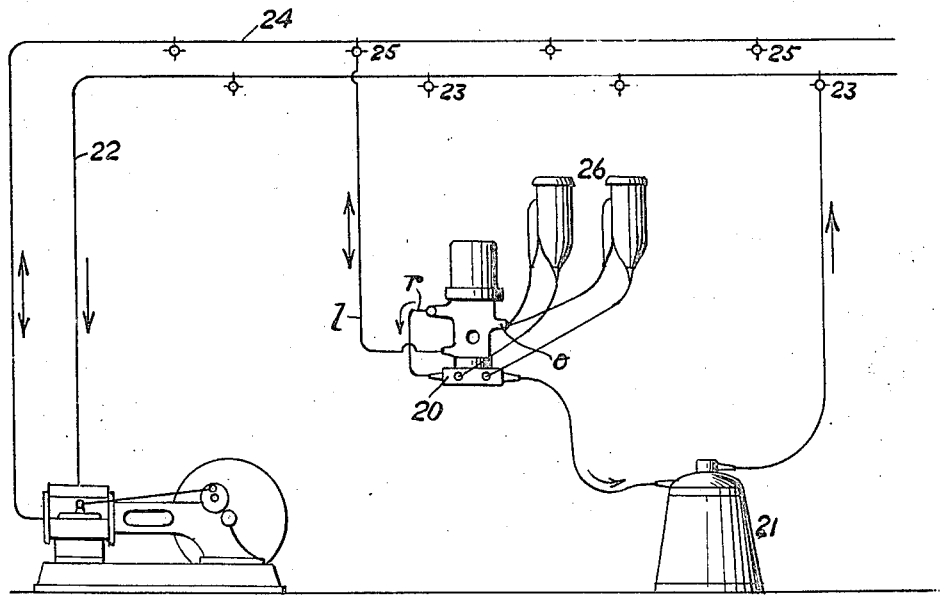
Fig. 4 is a diagram of a complete installation with my improved valve forming part of a portable milking machine unit and therein used to transmit pneumatic pulsations from a main pipe line to pipes leading direct to the inflation chambers of double chambered teat cups.

In Fig. 4 my improved valve is shown adapted to a pulsator forming part of an individual portable milking machine unit, as, for example, a pulsator in the claw 17 of Fig. 3. The vacuum line $r$ is shown as connected to the milk chamber 20 of the claw, which is connected with the milk pail 21, in turn connected with the main vacuum pipe line 22 at any of the cocks 23. The primary pulsation pipe $l$ is connectible with the main primary pulsation pipe line 24 at any of the cocks 25. The secondary pulsation pipe $o$ is shown as connected with the inflation chambers of teat cups 26, the suction chambers of the teat cups being connected with the milk chamber 20 of the claw.

While I have described my relay as adapted to produce secondary pulsations in one pulsation pipe line or in a plurality of pulsation pipe lines in unison, my invention is not intended to be limited to such an arrangement or to exclude an obvious rearrangement of ports and chambers to produce pulsations in two secondary pulsation pipes alternately.

I am aware that I am not the first in the art of milking machine pulsator valves to provide an air chamber of some size at one end of the valve chamber which communicates through a more or less restricted passage with the other end of the valve chamber. Such a valve is disclosed in the Hulbert Patent No. 1,392,570. In that patent, however, the pressure in the air chamber varies through a large percentage of the range of pulsations, and the rise and fall of pressure therein are depended upon to effect the reciprocation of the piston. In my invention the chamber is so large relatively to the restricted passage in the piston that the pressure in the chamber is nearly uniform at a value approximating the mean of the pressure from the source of pulsations.

Having now fully described my invention, what I claim and desire to protect by Letters Patent is:

1. In a milking machine relay, in combination, a source of pneumatic pulsations independent of the relay, a cylinder one end only of which is adapted to communicate with said source of pneumatic pulsations, an air chamber in communication with the other end of the cylinder, and a piston in the cylinder, there being a constantly open restricted passage affording communication between the source of pneumatic pulsations and the air chamber, the air chamber being of sufficient size relative to said restricted passage to maintain therein an approximately uniform pressure at a value substantially half way between the extremes of the pulsations.

2. In a milking machine relay, in combination, a source of pneumatic pulsations independent of the relay, a cylinder one end only of which is adapted to communicate with said source of pneumatic pulsations, an air chamber in communication with the other end of the cylinder, and a piston in the cylinder comprising hollow open ends and a connecting member provided with a restricted passage affording free communication between the ends of the cylinder, the air chamber being of sufficient size relative to said restricted passage to maintain therein an approximately uniform pressure at a value substantially half way between the extremes of the pulsations.

3. In a milking machine relay, in combination, a cylinder provided with an atmospheric port, a vacuum port and a pulsation port, a piston in the cylinder adapted in its reciprocations to connect the pulsation port alternately with the vacuum port and with the atmospheric port, a source of pneumatic pulsations independent of the relay, a primary pulsation pipe connecting said source with one end only of the cylinder, and means cooperating with the primary pulsations in said pipe to maintain the pulsation port in communication with the vacuum port and with the atmospheric port for substantially equal time intervals.

4. In a milking machine relay, in combination, a cylinder provided with an atmospheric port, a vacuum port and a pulsation port, a piston in the cylinder adapted in its reciprocations to connect the pulsation port alternately with the vacuum port and with the atmospheric port, means to transmit pneumatic pulsations to one end of the valve, and means to maintain the pneumatic pressure operative on the other end of the valve approximately constant and at a value substantially half way between the extremes of the pulsations, whereby the pulsation port is placed in communication with the vacuum port and with the atmospheric port for substantially equal time intervals.

5. In a milking machine relay, a source of pneumatic pulsations independent of the relay, a cylinder one end only of which is adapted to communicate with said source and provided with an atmospheric port, a vacuum port and a pulsation port, a piston in the cylinder adapted in its reciprocations to connect the pulsation port alternately with the vacuum port and with the atmospheric port, and means to maintain an approximately uniform pressure in the other end of the cylinder at a value substantially half way between the extremes of the pulsations.

6. In a milking machine relay, a source of pneumatic pulsations independent of the relay, a cylinder one end only of which is adapted to communicate with said source and provided with an atmospheric port, a vacuum port and a pulsation port, a piston in the cylinder adapted in its reciprocations to connect the pulsation port alternately with the vacuum port and with the atmospheric port, and an air chamber in communication with the other end of the cylinder, there being a constantly open restricted passage between the ends of the cylinder, the air chamber being of sufficient size relative to said restricted passage to maintain therein an approximately uniform pressure at a value substantially half way between the extremes of the pulsations.

7. In a milking machine relay, in combination, an upright cylinder provided with an atmospheric port, a vacuum port and a pulsation port, a piston in the cylinder adapted in its reciprocations to connect the pulsation port alternately with the vacuum port and with the atmospheric port, a source of pneumatic pulsations independent of the relay and adapted to communicate with one end only of the cylinder, an air chamber in communication with the upper end of the cylinder, there being a restricted passage between the ends of the cylinder, the air chamber being of sufficient size relative to said restricted passage to maintain therein an approximately uniform pressure at a value substantially half way between the extremes of the pulsations, and pneumatically controlled means to balance the weight of the valve and counteract the tendency of the piston to remain longer at the bottom than at the top.

8. In a milking machine relay, in combination, a cylinder one end of which is adapted to communicate with a source of pneumatic pulsations, two air chambers of different size, one in communication with the center, and the other in communication with the periphery, of the other end of the cylinder, there being a restricted passage from the source of pneumatic pulsations to the larger chamber, a vacuum connection, a piston reciprocable in the cylinder, provision for a leakage from the smaller chamber to the vacuum connection, and means on the end of the piston adjacent the two chambers, operable, when the piston is at the end of its stroke toward the first chamber, to prevent communication between the chambers and bring the peripheral portion of the piston under the reduced pressure in the smaller chamber.

9. In a milking machine relay, in combination, a cylinder one end of which is adapted to communicate with a source of pneumatic pulsations, two air chambers of different size, one in communication with the center, and the other in communication with the periphery, of the other end of the cylinder, there being a restricted passage from the source of pneumatic pulsations to the larger chamber, a piston reciprocable in the cylinder, a port, provision for a leakage between said port and the smaller chamber, and means on the end of the piston adjacent the two chambers operable, when the piston is at the end of its stroke toward the larger chamber, to prevent communication between said chambers, thereby causing the peripheral portion of the piston to be brought under the influence of only the pressure in the smaller chamber.

In testimony of which invention, I have hereunto set my hand, at Poughkeepsie, on this 11 day of February, 1921.

SELDEN H. HALL.